Oct. 13, 1953  G. H. RAKOWITZKY  2,654,930
SLIDE FASTENER
Filed Aug. 17, 1949
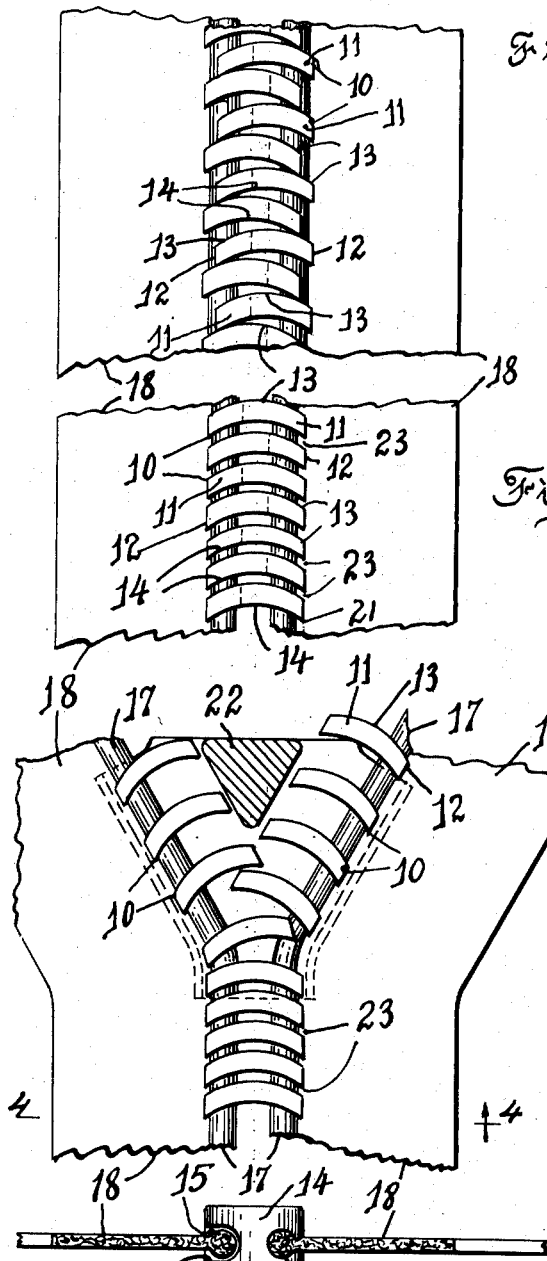
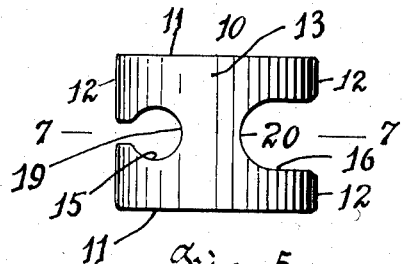
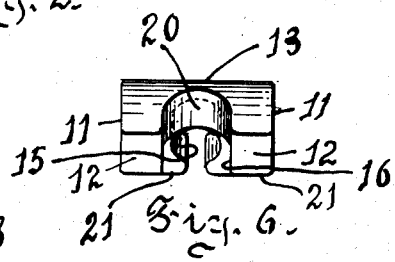
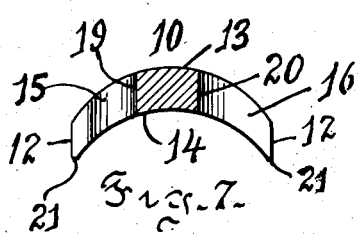
INVENTOR.
G. H. Rakowitzky
BY
B. Joffe Patented Oct. 13, 1953

2,654,930

UNITED STATES PATENT OFFICE 2,654,930

SLIDE FASTENER

Gregor H. Rakowitzky, Kings County, N. Y.; Eli Rakowitzky, administrator of said Gregor H. Rakowitzky, deceased Application August 17, 1949, Serial No. 110,845

5 Claims. (Cl. 24—205.13)

My invention relates to a slide fastener mounted on stringers and manipulated by means of a slide.

The object of the invention is to provide a slide fastener that does not require as close a machining tolerance as the present ball and socket type of slide fastener.

Another object of the invention is to provide a slide fastener in which the elements forming the fastener are interengaged with a clearance therebetween when the fastener is closed.

A further object of the invention is to provide a slide fastener having the appearance of a solid metal unit when the fastener is closed.

A still further object of the invention is to make the elements attached to one stringer to engage the stringer of the opposite elements when the fastener is closed.

The operation of the fastener is based on moving angularly in opposite direction, by means of a slide, proximate fastener elements, each element having surface curvatures that interengage with a clearance therebetween in normal closed position.

Any attempt to separate the elements without a slide is prevented either by interengagement of elements with the bead of the opposite stringer or by the abutment of the curved surfaces of adjacent elements or both.

In the appended drawing forming part of this application:

Figure 1 is a magnified elevation of the fastener, the slide being shown in section;

Figure 2 is a magnified elevation of a section of the fastener closed;

Figure 3 is a similar elevation showing the maximum displacement of the elements in the closed position of the fastener;

Figure 4 is a section on line 4—4, Figure 1;

Figure 5 is a plan view of the convex surface of the elements;

Figure 6 is an end elevation of the element; and

Figure 7 is a section on line 7—7, Figure 5.

Referring to the drawings:

The fastener elements 10 are all alike, each having a rectangular contour formed by sides 11 and ends 12. The top 13 and bottom 14 are convex and concave respectively, and of the same cylindrical curvature, so that the ends 12 are of lesser thickness than the middle of the elements, as best shown in Figure 7. Each element has opposite end cut-outs 15 and 16 respectively, first for clamping the element to the edge bead 17 of the stringer 18, and the other cut-out 16 accommodating the bead of the opposite stringer when the fastener is closed. The element therefore is an arched plate.

The end walls 19 and 20 of the cut-outs 15 and 16 are perpendicular to the plane in which the bottom edges 21 of the arch lie. The length of the span between the edges 21 is greater than the radius of curvature of the cylindrical surface of the elements and may be expressed as $R = .6S$. The width of the element 10 is less than the length of the span, but it is sufficient to provide walls on the side of cut-out 16 strong enough to resist lateral shear. The ratio of the width of the elements to the length of the span is about 3 to 4.

As shown in Figure 1, two opposite stringers 18, each provided with spaced elements 10 on each bead 17 thereof, are engaged by a slide 22. The distance between the elements 10 on the same bead, that is, between the convex and concave surfaces of adjacent elements 10 equals the thickest part of the element plus the clearance 23 provided between the adjacent elements 10 on opposite beads when the fastener is closed, as shown in Figure 2. The thickest part of the elements 10 lies in a plane perpendicular to the span and contains elements of each cylindrical surface. The ratio of the thickest part to that of the radius of curvature is 1 to 3. With the added clearance 23, provided to each convex and concave surface of an element, the sum may be expressed as a ratio to the radius of curvature as 1 to 2. Therefore, a clearance at the central portion of super-imposed arcuated elements is equal to $\frac{1}{2}$ of the radius of curvature of the element.

When a fastener of my construction is closed, as shown in Figure 2, the clearance 23 between each element permits a relative longitudinal movement of the elements connected to the opposite beads of the stringers. This displacement is arrested by the engagement of the edges 21 of the span of each element with the corresponding convex surface of the proximate element, so that each element 10 acts as an abutment limiting the longitudinal displacement of the elements as indicated. The relative distance the elements 10 move when in closed position, as shown in Figure 3, may be expressed in a ratio to the radius as about 1 to 7. Its maximum displacement in closed position shows in Figure 3 that the major body portion of the bead 17 of the stringer 18 remains straddled by the cut-out 15 of the elements 10, thus preventing separation in the lateral direction or transverse to the curvature of the elements.

The opening and closing of the fastener by the slide 22, as illustrated in Figure 1, do not differ from the present type of ball and socket fastener.

It will be noted that in my fastener the elements 10 do not interlock normally when the fastener is closed, as shown in Figure 1. The elements 10 of the fastener are spaced by the clearance 23 as previously explained. This arrangement permits the manufacture of the elements and their assembly with machine tolerance not as close as required in the manufacture of ball and socket type of slide fastener. Furthermore, the tooling and number of operations required in the manufacture of my slide fastener are less costly and exacting than the present ball and socket fastener.

In the element of the fastener, the curved surface extends through its entire top and bottom areas, and the fastener elements are superimposed when the fastener is closed by their slide to present a substantially co-axial unit of spaced fastening elements in the normal position, as shown in Figure 1. The elements of the fastener are superimposed with a clearance therebetween, and it is only when a limited movement is attempted by pulling on the stringers to separate them that the clearance is deformed in the fastener, as shown in Figure 3.

The longitudinally arched fastener elements are moved by the slide in the direction of their arch or curvature whether closing or opening the fastener.

I claim:

1. In a slide fastener, a pair of stringers and fastener elements secured alternately to respective stringers in predetermined spaced relation on said stringers, each of said elements having a convex and concave surface of equal radius, the maximum thickness between the curved surfaces being equal to one-third of the said radius, the distance between proximate elements of said stringer being equal to one-half of the said radius, the adjacent elements in closed position of the fastener have a clearance therebetween equal to one-twelfth of said radius, said clearance permitting a parting movement between stringers limited by the abutment of the proximate curved surfaces of adjacent fastener elements, and each of said elements having means to engage the stringer to which it is not attached to prevent a lateral movement of said element when the fastener is closed.

2. In a slide fastener, a pair of stringers and fastener elements secured to each stringer in predetermined spaced relation, each of said elements having convex and concave surfaces of equal radius extending through the entire length of the element, said elements being adapted to be superimposed with a clearance between adjacent surfaces of the elements in closed position of the fastener, said clearance being equal to one-twelfth of the said radius to permit a longitudinal displacement between adjacent elements limited by the abutment of the proximate curved surfaces of the adjacent fastener elements, each of said elements having means to engage the stringer it is not attached to in the closed position of the fastener.

3. In a slide fastener, a pair of stringers and fastener elements secured alternately to each stringer in predetermined spaced relation on the same stringer, each of said elements having convex and concave surfaces of equal radius extending the entire length of the element so that the element is arched, the maximum thickness of said arch equals one-third of the said radius, said elements adapted to be superimposed with a clearance between adjacent elements in closed position of the fastener with the convex sides of each element uppermost, said clearance between adjacent elements being equal to one-twelfth of the said radius and permitting a relative movement between the stringers, limited by the abutment of the proximate curved surfaces of the adjacent fastener elements, each of said fastener elements having means to engage the stringer it is not secured to in the closed position of the fastener.

4. In a slide fastener, a pair of stringers and arched fastener elements secured alternately to said stringers with one arched end and extending with the other arched end towards the opposite stringer, the radius of curvature of the surfaces of the arch being equal, and the maximum thickness of the arch between the curved surfaces equals one-third of the said radius, said elements being spaced on each stringer through a distance equal to one-half of said radius to provide a clearance between adjacent elements in the closed position of the fastener equal to one-twelfth of said radius to permit a relative movement between the stringers limited by the abutment of the proximate curved surfaces of proximate elements, each fastener element having its unconnected end provided with means to engage the stringer it is not secured to in the closed position of the fastener.

5. In a slide fastener, a pair of stringers and fastener elements secured to each stringer in predetermined spaced relation, each of said elements having a convex and concave surface of cylindrical curvature of equal radius extending through the entire length of the element so that the element is arched, the maximum thickness of said arched plate being equal to one-third of the said radius, said elements being spaced on each stringer to equal one-half of the said radius to provide a clearance between adjacent curved surfaces of proximate elements extending from the opposite stringer in closed position of the fastener, said clearance being equal to one-twelfth of the radius for permitting a longitudinal displacement between adjacent elements, limited by the inter-engagement of the unconnected edge of the concave face of each element with the convex surface of the adjacent element in proximity of its connection with the stringer, each of said fastener elements having means at the unconnected end to engage the stringer to which it is not secured.

GREGOR H. RAKOWITZKY.

References Cited in the file of this patent

UNITED STATES PATENTS

| Number | Name | Date |
|---|---|---|
| 1,714,726 | Pipes | May 28, 1929 |
| 1,857,309 | Jacobs | May 10, 1932 |
| 1,864,614 | Poux | June 28, 1932 |
| 2,082,619 | Dau | June 1, 1937 |
| 2,125,698 | Ulbricht | Aug. 2, 1938 |

FOREIGN PATENTS

| Number | Country | Date |
|---|---|---|
| 442,809 | Great Britain | of 1936 |
| 615,359 | Great Britain | of 1949 |